United States Patent [19]
Hashimukai et al.

[11] Patent Number: 5,993,008
[45] Date of Patent: *Nov. 30, 1999

[54] FRONT LIQUID CRYSTAL DISPLAY PROJECTOR

[75] Inventors: Masanari Hashimukai; Takehiro Okada, both of Ibaraki; Shozo Aono; Makoto Hoshino, both of Takatsuki, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,749

[22] Filed: Sep. 10, 1997

[30] Foreign Application Priority Data

Sep. 12, 1996 [JP] Japan ..................... 8-241760

[51] Int. Cl.$^6$ .................................................. G03B 21/16
[52] U.S. Cl. ............................................ 353/61; 353/119
[58] Field of Search .......................... 353/119, 30, 61, 353/60, 52, 57, 34; 359/452

[56] References Cited

U.S. PATENT DOCUMENTS

| Re. 28,274 | 12/1974 | Altman | 353/44 |
|---|---|---|---|
| 3,951,535 | 4/1976 | Altman | 353/66 |
| 5,367,444 | 11/1994 | Bornhorst | 362/264 |
| 5,488,436 | 1/1996 | Choi | 353/34 |
| 5,626,409 | 5/1997 | Nakayama | 353/31 |
| 5,743,612 | 4/1998 | Matsuda | 353/97 |
| 5,777,804 | 7/1998 | Nakamura | 353/98 |

FOREIGN PATENT DOCUMENTS

| 0 773 691 | 5/1997 | European Pat. Off. |  |
|---|---|---|---|
| 92 09 965 | 9/1992 | Germany . |  |
| 5-2215 | 1/1993 | Japan | 353/119 |
| 5-34825 | 2/1993 | Japan . |  |
| 6-118365 | 4/1994 | Japan | 353/119 |
| WO 86/07167 | 12/1986 | WIPO . |  |

OTHER PUBLICATIONS

XP-002106054, Cooling Projection System for Passive Display, IBM Technical Disclosure Bulletin, vol. 29, No. 9., Feb. 1987.

European Search Report for Int'l Appln No. EP 97 11 3837 dated Jul. 6, 1999.

Primary Examiner—William Dowling
Attorney, Agent, or Firm—Ratner & Prestia

[57] ABSTRACT

A front liquid crystal display projector includes a housing having an exhaust port and a projection opening, an optical block, installed in the housing, having a light source, a reflection mirror, a light separator, an image display unit using liquid crystal, an image combining unit, a projection lens, and an exhaust fan installed between the light source and the exhaust port. The reflection mirror changes the direction of the light from the light source, and the projection lens and the light source are disposed parallel to each other. The exhaust port and the projection opening are provided at a first side of the housing. An image formed by the optical block is projected from the first side and from the projection opening, and air in the housing is discharged from the exhaust port and also from the first side. In addition, the exhaust port prevents stray light from the light source, which exits the exhaust port, from overlapping the image projected from the projection opening.

10 Claims, 2 Drawing Sheets

FRONT LIQUID CRYSTAL DISPLAY PROJECTOR

FIELD OF THE INVENTION

The present invention relates to an image display device, and more particularly to a liquid crystal display projector.

BACKGROUND OF THE INVENTION

With the advancement of video display devices using liquid crystal panels or the like, there has been a great deal of development. Front liquid crystal display projectors have been part of this development.

For example, Japanese Laid-open Patent 5-2215 discloses a projection type liquid crystal display device for decreasing the effects of light leaking from a light source lamp, exhaust hot air from a cooling fan, and fan noise all directed towards a viewer. In the projection type liquid crystal display disclosed in Japanese Laid-open Patent 5-2215, an exhaust port is formed at a position which is opposite the projection direction side where the projection lens is situated. In such a conventional constitution, however, there is a problem in that the air heated by the light source lamp is discharged to the viewer side through the exhaust port. Yet, attempts to prevent light leaking from the light source lamp, hot air, and noise all being directed to the viewer were not sufficient.

SUMMARY OF THE INVENTION

A front liquid crystal display projector in accordance with an exemplary embodiment of the present invention comprises a housing having an exhaust port and a projection opening, and an optical block having a light source and a projection lens which are installed in the housing. The exhaust port and projection opening are formed at a first side of the housing, an image formed by the optical block is projected in the direction of the first side from the projection opening, and the air in the housing is discharged from the exhaust port and out the first side.

The optical block comprises (a) the light source, (b) a color separator, (c) an image display unit using liquid crystal, (d) an image combining unit, and (e) the projection lens. The light emitted from the light source sequentially passes through the color separator, the image display unit using liquid crystal, the image combining unit, and projection lens, and a color image is projected from the projection lens.

More preferably, the front liquid crystal display projector further comprises an exhaust fan installed at the middle side or outer side of the housing, or near the exhaust port. The exhaust fan has the function of discharging the air in the housing by force from the exhaust port.

Preferably, the projection lens and light source are disposed parallel to each other.

Preferably, the optical block comprises the light source, reflection mirror, light separator, image display unit using liquid crystal, image combining unit, and projection lens The light emitted from the light source sequentially passes through the reflection mirror, color separator, image display unit using liquid crystal device, image combining unit, and projection lens, and a color image is projected from the projection lens.

In this constitution, light that leaks out of the light source will not get into the eyes of the viewers. Moreover, hot air does not reach the viewers. The noise of the exhaust fan reaching the viewers is reduced. A compact and simple optical block is obtained. Also, the problems associated with excessive temperature in the set main body is addressed.

DESCRIPTION OF THE PREFERRED EMBODIMENT

Figure 1A:
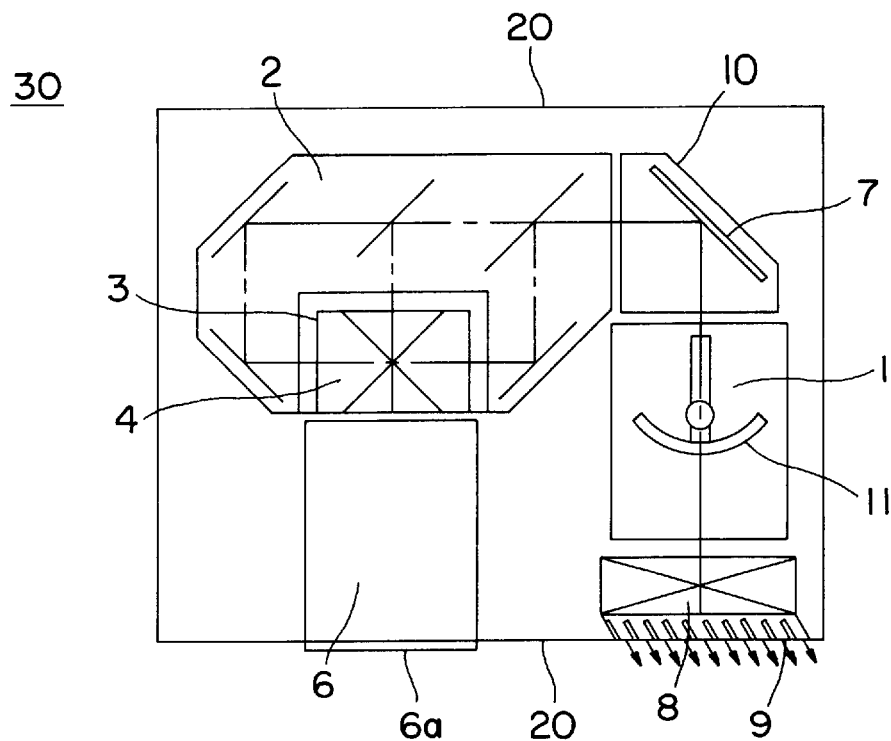
FIG. 1(A) is a schematic diagram in a plane direction for explaining a constitution of a front liquid crystal display projector in accordance with an exemplary embodiment of the present invention.

Referring now to the drawings, a front liquid crystal display projector in accordance with an exemplary embodiment of the present invention is described in detail below.

Figure 1B:
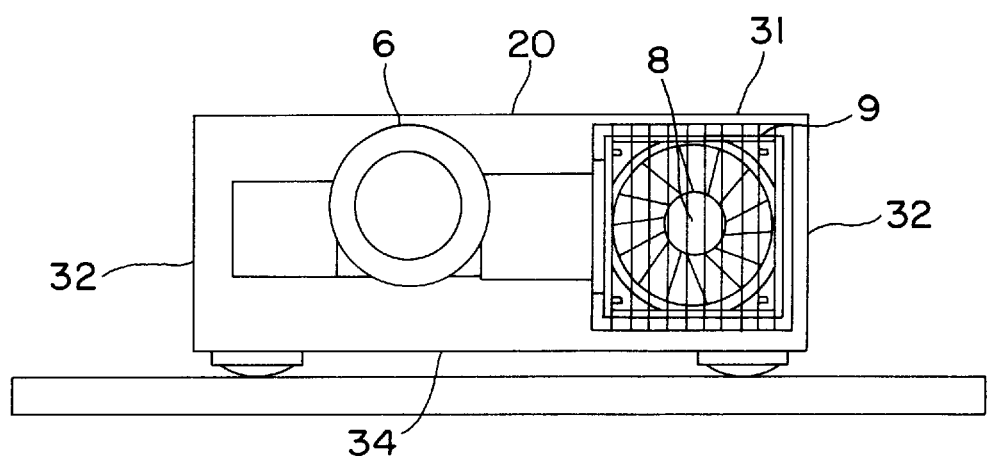
FIG. 1(B) is a block diagram in a front direction of the front liquid crystal display projector shown in FIG. 1(A).

To explain the exemplary embodiment of the present invention, schematic diagrams in the plane direction and front direction are shown in FIG. 1(A) and FIG. 1(B). In FIG. 1(A) and FIG. 1(B), an optical block 10 and an exhaust fan 8 are installed in a housing 20. The optical block 10 comprises a light source 1 having a focusing mirror 11, a reflection mirror 7, a color separator 2 for separating the color from the light source 1 into red, green and blue, an image display unit 3 for displaying an image having a liquid crystal panel for red, a liquid crystal panel for green, and a liquid crystal panel for blue, an image combining unit 4 for combining the red image, green image, and blue image, and a projection lens 6 for projecting the combined image. The reflection mirror 7 is installed between the light source 1 and color separator 2. Such plural constituent elements are disposed in a U shape form in the housing 20.

The light emitted from the light source 1 is changed in direction by the reflection mirror 7, and passes through the color separator 2, image display unit 3, image combining unit 4, and projection lens 6. The housing 20 includes an exhaust port 9 and a projection opening 6a. The light source 1 has a lamp emitting a bright light. The back direction of the light source 1 and the projection direction of the projection lens 6 face the same direction. The projection lens 6 projects an image forward from the projection opening 6a. The light source 1 and projection lens 6 are disposed closely to each other. The exhaust fan is located at the back side of the light source 1. The housing 20 has the exhaust port 9 formed near the exhaust fan 8 in order to discharge the air exhausted from the exhaust fan 8. The exhaust port 9 has a sufficiently large hole for enhancing the air exhaust efficiency. The projection opening of the projection lens 6 and the exhaust port 9 are disposed at the same side of the housing 20. That is, the projection opening of the projection lens 6 and the exhaust port 9 are provided at the first side of the housing 20. The exhaust port 9 having a specified shape is formed so that the direction of the air exhausted from the exhaust port 9 may be in a range of about 15 degrees to 90 degrees relative to the center line of an image projected from the projection lens.

Figure 2:
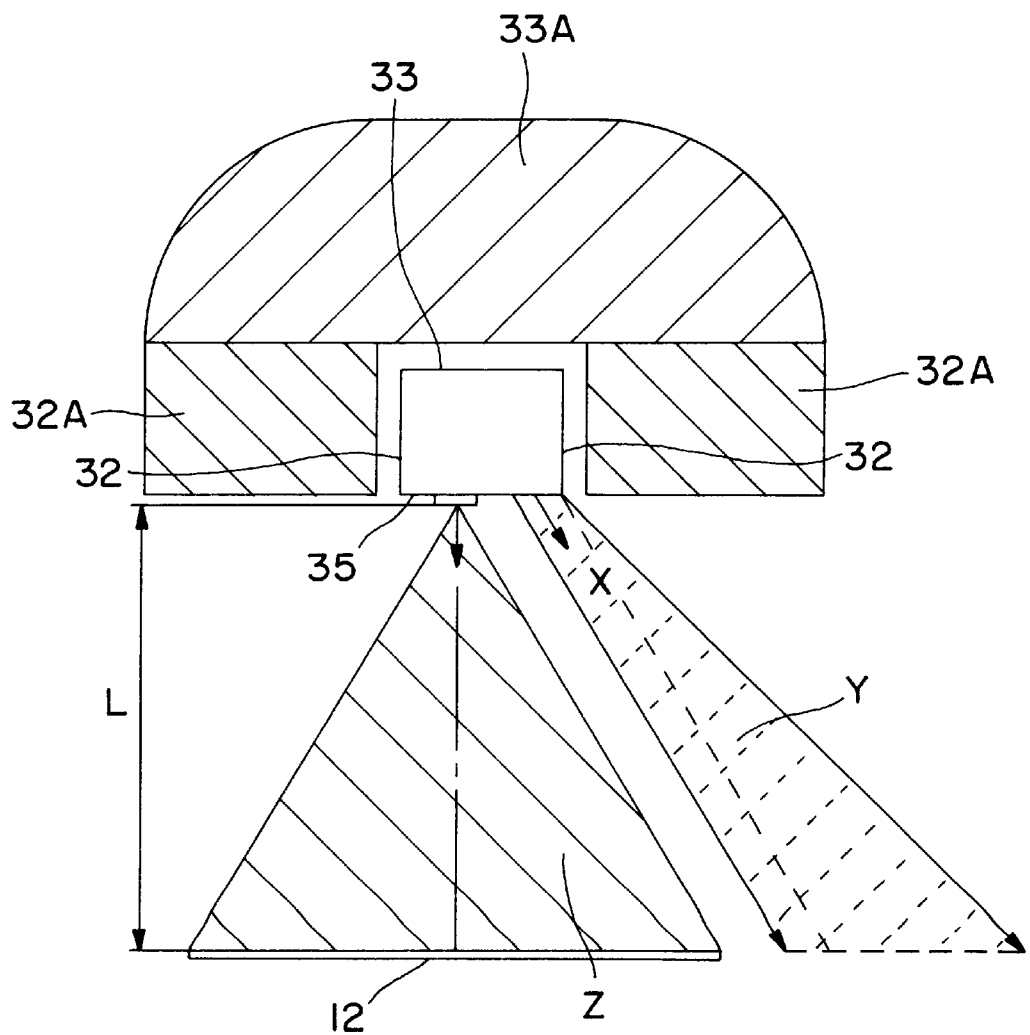
FIG. 2 is a schematic diagram for explaining the configuration of a front liquid crystal display projector in accordance with the exemplary embodiment of the present invention.

The lamp in the light source 1 generates a great deal of heat. Therefore, the inside of the set main body 30 may be heated to high temperature. To prevent abnormally high temperatures due to accumulation of heat, the exhaust fan 8 has the function of discharging hot air from the set main body 30 to prevent excessive temperature in the set main body 30. The high temperature generated in the light source 1 is exhausted by force from the exhaust port 9 to outside of the set main body 30 by the exhaust fan 8. The light released from the light source 1 is reflected and focused by the focusing mirror 11, and is changed in direction by the reflection mirror 7, and passes sequentially through the image display unit 3 and image combining unit 4, and is magnified and projected on a screen 12 by the projection lens 6. Thus, a color image is displayed on the screen 12 (FIG. 2). In this constitution, part of the light of the light source 1 is released outside of the housing 20 as light which leaks from the light source from the exhaust port 9.

In this embodiment, meanwhile, the exhaust fan 8 is disposed inside of the exhaust port 9, but it may also be disposed outside of the exhaust port 9.

FIG. 2 is a schematic diagram for explaining the configuration of the front liquid crystal display projector shown in FIG. 1(A) and FIG. 1(B). In FIG. 2, the projection screen 12 is disposed facing the front side 35 of the set main body. Usually, when the projection distance L is short, so as not to disturb projection, viewers are positioned in a rear region 33A facing the rear side 33 of the set main body and a lateral region 32A in the direction of a lateral side 32 of the set main body. The image light emitted from the projection opening 6a of the projection lens 6 passes through the range of region "Z" and is displayed on the projection screen 12. Leak light from the light source 1, and hot exhaust air from the exhaust fan 8 are emitted in the direction of arrow "X" from the front side 35 of the set main body, and have effects in an area designated as region "Y". In this case, the direction of arrow "X" is preferred to be in a range of about 15 degrees to about 90 degrees relative to the front side 35 of the set main body. By setting such an angle range, the "region Z" of the projected image light is not overlapping with the region "Y" of leak light.

In such constitution, the viewer is free from effects of leak light and exhaust air. Moreover, the image projected on the screen 12 is free from effects of leak light. Still further, a larger exhaust port can be formed, so that the ability to prevent temperature rise in the set main body is enhanced.

By contrast, usually, the set main body is placed and used on a desk or floor. Therefore, if the exhaust port is formed in the bottom 34 of the set main body 20 (FIG. 1(B)), the temperature in the set main body and on the desk or floor elevates, which poses a problem in safety. When the exhaust port is formed on the opposite side of the projection direction, the viewer suffers effects of leak light and exhaust air. If the exhaust port is formed on the top of the set main body, the viewer suffers effects of leak light and exhaust air.

In this constitution, leak light of the light source will not get into the eyes of viewers. Hot air does not reach viewers. The noise of the exhaust fan reaching the viewers is reduced. A compact and simple optical block can be obtained. The ability to prevent temperature rise in the set main body is enhanced.

Although the invention has been illustrated and described with regard to exemplary embodiments, the invention is not intended to be limited to the details as illustrated and described. Rather, various modifications may be made in the details within the scope and range of equivalence of the claims and without departing from the spirit of the invention.

We claim:

1. A front liquid crystal display projector comprising:
a housing having an exhaust port and a projection opening, said exhaust port and said projection opening at a front face of said housing,
an optical block having a light source and a projection lens located in said housing, an image formed by said optical block is projected from said projection opening at said front face, said projected image having a center line as it is projected from said projection opening, and
light and air directing means for preventing light from said light source emitted from said exhaust port from overlapping said image projected from said projection opening, and for sidewardly discharging air in said housing from said exhaust port in a range of about 15 degrees to 90 degrees from the center line of said projected image.

2. A front liquid crystal display projector according to claim 1, wherein said optical block comprises said light source, a color separator, an image display unit using liquid crystal, an image combining unit, and said projection lens, wherein the light emitted from said light source sequentially passes through said color separator, said image display unit using liquid crystal, said image combining unit, said projection lens, and a color image is projected from said projection lens.

3. A front liquid crystal display projector according to claim 1, further comprising an exhaust fan located in said housing, wherein said exhaust fan discharges air in said housing by force from said exhaust port.

4. A front liquid crystal display projector according to claim 1, further comprising an exhaust fan located between said light source and said exhaust port, wherein said exhaust fan is disposed at an opposite side of a running direction of light of said light source, and said exhaust fan discharges air in said housing by force from said exhaust port.

5. A front liquid crystal display projector according to claim 1, further comprising an exhaust fan located at an outside of said exhaust port of said housing, wherein said exhaust fan has a function of discharging the air in said housing by force from said exhaust port.

6. A front liquid crystal display projector according to claim 1, wherein said projection lens and said light source are disposed parallel to each other.

7. A front liquid crystal display projector according to claim 1, wherein said optical block has a reflection mirror located between said light source and said projection lens, and said reflection mirror changes the direction of light emitted from said light source.

8. A front liquid crystal display projector comprising:
(a) a housing having an exhaust port and a projection opening,
(b) an optical block having a light source and a projection lens, being located in said housing, and
(c) an exhaust fan located between said light source and said exhaust port,
said projection lens and said light source are disposed parallel to each other, said exhaust port and said projection opening are at a front face of said housing, an image formed by said optical block is projected from said front face and from said projection opening, said projected image having a center line as it is projected from said projection opening, and
light and air directing means for preventing light from said light source emitted from said exhaust port from overlapping said image projected from said projection opening, and for sidewardly discharging air in said housing from said exhaust port in a range of about 15 degrees to 90 degrees from the center line of said projected image.

9. A front liquid crystal display projector comprising:
(a) a housing having an exhaust port and a projection opening, (b) an optical block, located in said housing, having (1) a light source, (2) a projection lens, and (3) a reflection mirror disposed between said light source and said projection lens, (c) an exhaust fan located between said light source and said exhaust port, wherein said reflection mirror changes the direction of light emitted from said light source, said projection lens and said light source are disposed parallel to each other, said exhaust port and said projection opening are at a front face of said housing, an image formed by said optical block is projected from said front face and from said projection opening, said projected image having a center line as it is projected from said projection opening, and air in said housing is discharged sidewardly from said exhaust port in a range of about 15 degrees to 90 degrees from the center line of said projected image, and light directing means for preventing light from said light source emitted from said exhaust port from overlapping said image projected from said projection opening.

10. A front liquid crystal display projector in accordance with claim 9, wherein said optical block comprises said light source, said reflection mirror, a light separator, an image display unit using liquid crystal, an image combining unit, and said projection lens, and the light emitted from said light source sequentially passes through said reflection mirror, said color separator, said image display unit using liquid crystal, said image combining unit, and said projection lens, so that a color image is projected from said projection lens.

* * * * *